F. R. TAISEY.
CONVEYER.
APPLICATION FILED MAY 16, 1918.
1,437,784. Patented Dec. 5, 1922.
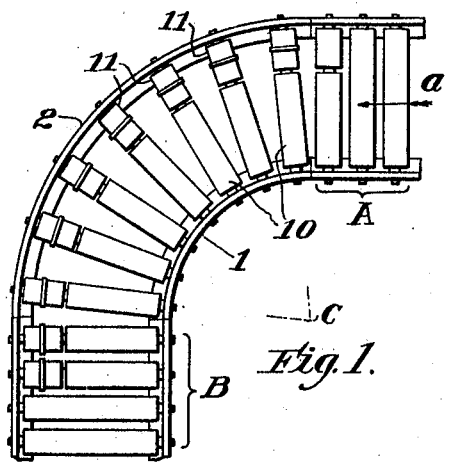
Fig. 1.
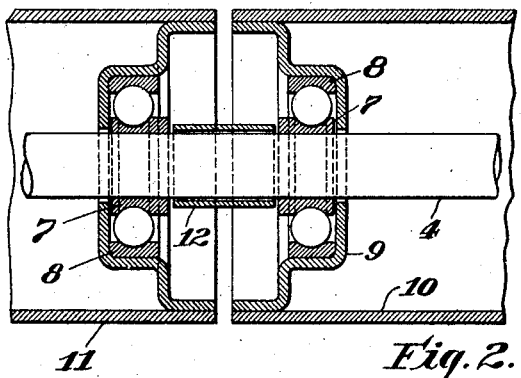
Fig. 2.
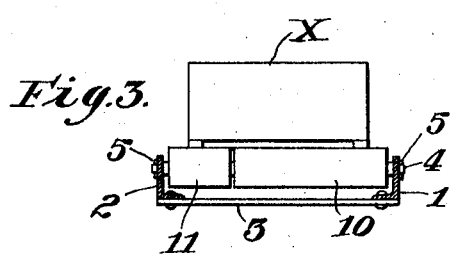
Fig. 3.
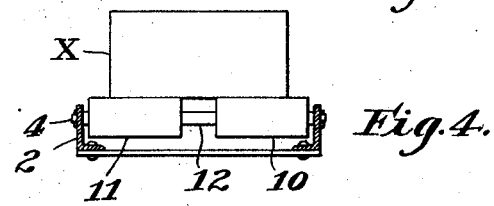
Fig. 4.
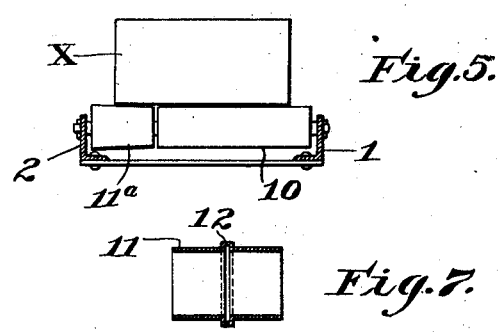
Fig. 5.
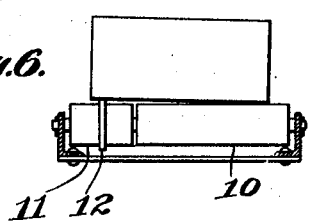
Fig. 6.
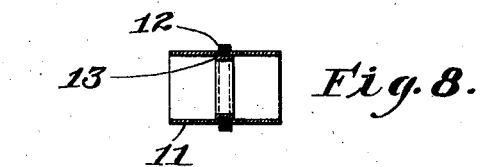
Fig. 7.
Fig. 8.
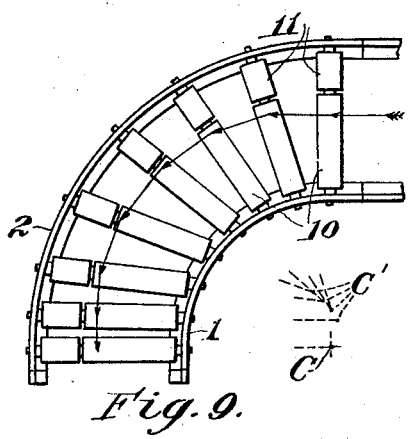
Fig. 9.
Inventor
Fred R. Taisey,
by Roberts, Roberts & Cushman
his Attorneys Patented Dec. 5, 1922.

1,437,784

UNITED STATES PATENT OFFICE.

FRED R. TAISEY, OF LOWELL, MASSACHUSETTS, ASSIGNOR, BY MESNE ASSIGNMENTS, TO THE LAMSON COMPANY, OF BOSTON, MASSACHUSETTS, A CORPORATION OF MASSACHUSETTS.

CONVEYER.

Application filed May 16, 1918. Serial No. 234,961.

*To all whom it may concern:*

Be it known that I, FRED R. TAISEY, a citizen of the United States of America, and resident of Lowell, in the county of Middlesex and State of Massachusetts, have invented new and useful Improvements in Conveyers, of which the following is a specification.

This invention relates to conveyers of the type adapted to provide an antifriction track or way for objects, packages or materials driven along the conveyer by gravity or other force. Conveyers of the type in question are in familiar use for loading, unloading and carrying all sorts of materials and products indoors and out. The variety of places in which such conveyers are used necessitates provision of curved sections adapted safely to carry the materials, products or packages conveyed around greater or lesser angles at points in the length of the conveyer. Heretofore in the best practice dependence has been placed upon guide rails or flanges adapted to contact with the packages, materials or products being conveyed to keep the thing conveyed upon the conveyer at lateral curves. I am also aware of instances in the prior art of attempts to direct the material at curves in such a conveyer by elevating the axis of the rolls at the convex side of the curve, by the provision of flanges on the wheels or rolls making up the conveyer, or by grooves in the conveyer rolls; or by the provision of conical conveyer rolls at and applicable only to curves of fixed dimensions, so that differently formed rolls have to be provided for each differing curve.

It is a requisite of any such construction for full usefulness that installation shall easily be made at any particular place without using other than standard types of parts or elements. Hence it is desirable not to depend upon a track curved out of a plane, or upon conical or grooved or flanged rolls to retain the materials or packages on the conveyer at curves, such structures either having to be designed in respect to the radius of the curved section, or too large a number of types of roll having to be provided in order to make installations to suit the needs of the place being equipped. The provision of fixed guide rails or flanges at the outer sides of lateral curves in such conveyers is objectionable in many instances because of the limitation placed upon the width of the package able to be conveyed, and in other cases it is objectionable because of the braking action of the guide rail upon the object being conveyed, it being understood that a principal use of said devices is for conveyers adapted to be set up horizontally or at a very slight angle to the horizontal for operation by the momentum or gravity of the thing being conveyed.

I have observed in the operation of such conveyers that the hold taken on the object or package conveyed by the surface of such a conveyer roll during the passage of the object over the roll strongly tends to direct the package at right angles to the axis of rotation of the roll. This directive action is so strong that in many cases a lateral curve in such a conveyer equipped with cylindrical rolls successively rotating on radii of the curve will exert a considerable and sometimes a sufficient directive force upon a package entering the curve at a tangent. I am aware of installations of gravity conveyers of this type in which comparatively difficult objects, such as very light paper boxes, cases of bottles full of liquid, or heavy objects such as assembled engines and machine tools, are directed around curves of fairly short radius by cylindrical rolls set to rotate on radii of the curve. But even in such cases there is some loss of direction by lateral slippage in the direction of the roll and loss of momentum due to the object having to pivot on one point and slip at other points in respect to the roll surface in contact with it.

A principal object of the present invention is to provide a section of conveyer of the type mentioned, in which tendency of the thing being conveyed to move laterally with respect to the longitudinal center of the conveyer track or way is opposed, the invention being particularly but not exclusively applicable to laterally curved sections of such conveyers. Other objects of the invention are to avoid guide rails, and to provide means for causing the orderly progress around a curve of a package, object or material being conveyed by gravity along a conveyer or way provided with antifriction bearing surfaces for the package or material by the unaided action of such surfaces; and to reduce loss of momentum by reducing slippage of the object longitudinally of the conveyer. Another object of the invention is to provide a roll or unit or section for gravity conveyers adapted without change to be installed in curves of various radii, and when installed to serve to direct things being conveyed by gravity around the curves without substantially displacing them laterally in relation to the conveyer or way.

Referring now to the accompanying drawings illustrating species only of the genus comprising the invention,—

Figure 1 is a plan illustrating one form of the invention;

Figure 2 is a longitudinal section through a spindle and rolls forming one unit of the curved part of the conveyer;

Figure 3 is a radial section at a curve illustrating a modification;

Figure 4 is a similar view illustrating another modification;

Figure 5 is a similar view illustrating another modification;

Figure 6 is a similar view illustrating another modification;

Figure 7 is a section through one of the rolls shown in Fig. 6;

Figure 8 is a view similar to Fig. 7, illustrating another form of construction; and Figure 9 is a view similar to Fig. 1, illustrating a modified form of installation.

Referring now to Fig. 1, a typical curve between straight sections A and B may comprise curved side rails 1 and 2 shown as circular, but which may be compounded of any number of arcs of circles of different radii or be of any geometric figure, such as elliptical or parabolic, as viewed in plan. As shown in Fig. 3, the rails 1 and 2 may be bent metal bars, shown as L-shaped bars, spaced apart at uniform radial distances by struts 3 riveted or bolted to their flanges. As shown in Fig. 1, the rails 1 and 2 are each bored, respectively at equal distances and in radial planes from the center of curvature C, to receive a shouldered spindle 4 which may be held in place by cotter pins 5 or other convenient fastening means, and upon which spindles the conveyer rolls proper are journaled.

Preferably, as illustrated in Fig. 2, the spindles 4 are provided with the inner members 7 of ball races 7, 8, the member 7 bearing or fitting on the spindle 4, and the outer member 8 being fast in a recessed roll head 9 fastened within a tubular roll, as shown at 10, for instance by being welded thereto; but any other bearing construction may be employed.

At the curves, as typified by the sections 1, 2, I provide independently rotatable rolls at the radially inward and radially outward sides of the conveyer track; for instance rolls 10, and rolls 11, as illustrated in Figs. 2 and 3, constituting what I have hereinafter termed a multiple roll.

It will be understood that the bearing construction for the roll 11 may be the same as the bearing construction for the roll 10. The roll 11 may be held from contact with roll 10 by a tubular spacer 12, as shown in Fig. 2. In the form illustrated in Figs. 2 and 3 the roll 10 and the roll 11 are of the same diameter. Preferably the straight sections A and B next the curve have one or more multiple rolls adjacent the curved section.

When an object X moving in the direction of the arrow $a$, Fig. 1, encounters the curved section of the conveyer, its first contact will be with the inward section 10 of a radially placed multiple roll at the curve 1, 2. A changed direction of the object can not be given by contact with the part 10 of the roll without slippage, if the object is not free to pivot on the roll to the rear, and the outward part of the object, in order to change its direction, must move faster than the inward part. This accelerated motion necessary at the outward part of the package to enable it to change its direction, is permitted and induced by the independently movable roll 11, which in turn is enabled to impose motion in a direction perpendicular to its spindle upon that part of the package or object in contact with it and to permit further acceleration of the outward part of the object by the change of direction at the next roll ahead. This action takes place all around the curve, the independent rolls at the curve serving to direct a package or object supported in common by them without substantial loss of its energy of motion by increments away from the tangential directions, and preventing it from moving toward the outer edge 2 of the curve.

The particular form and dimension of the elements 10, 11, of the multiple roll may vary considerably, as may be desired, or best to conform to the place at which the device is to be installed, or the nature of the objects, materials or packages to be conveyed. For instance, as illustrated in Fig. 4 the roller section 10 and the roller section 11 may be of like length and considerably separated in the middle; or as illustrated in Fig. 5 the roller section 10 may be a cylinder and the roller section 11$^a$ may be a cone having its larger diameter somewhat greater than the diameter of the roll 10; or as illustrated in Fig. 6 the roll 11 may be provided with a lifting and directing ring 12 upon its periphery, which may be an integral or attached structure adapted to lift the package or object and to exercise a directive force upon it greater than that of the unaided surface of the roll 11. As shown in Fig. 7, the ring 12 may be rolled or cast in the metal body of the roll 11; or as shown in Fig. 8 the ring 12 may be seated in a depression 13 in the roll 11; or the ring 12 might be welded, brazed or otherwise fastened upon the surface of the roll 11 in any desired position.

The effect of the described multiple rolls is to enable a load of any width traveling around a curve to be directed by the action of rolls in respect to an inward point of contact, at the concave side of the track; and an outward point of contact, on an independently contacting roll and nearer the convex side of the track. The load is free to pivot by the turning effort of rolls at successive radii about these points of contact, and without the resistance which would be encountered if contact were maintained with an element of the surface throughout, as would be the case if the multiple rolls defined a conical surface.

In some situations, as where the frictional hold of the object or material on the rolls of the conveyer is not strong, and where the conditions are particularly difficult, as where a heavy object is to be carried around a curve of very short radius, I may resort to the expedient shown in Fig. 9, in which the axes of the successive rolls passing around a curve are not radial to the center C but are successively radial to false centers C' displaced from center C in a direction contrary to the direction of travel, so as to cause the surfaces of the rolls to have an inward directive component at the curve to counterbalance the outward motion in respect to the roll surface due to the centrifugal force at the curve.

Any desired or known construction of the rails 1, 2, struts 3, and the hangers or stanchions for supporting the conveyer may be employed.

I claim:—

1. A conveyer of the type comprising an antifriction track for the thing to be conveyed, having therein a curved portion having at respective sides thereof antifriction means rotatable about common axes and having surfaces adapted to support in common the thing conveyed, said surfaces severally being adapted independently to move at different rates with and in response to differing motions of the respective parts of the thing resting upon and conveyed thereby, one of said sections being a cylinder.

2. A conveyer of the type comprising an antifriction track for the thing to be conveyed, having therein at respective sides of the track antifriction rolls having surfaces rotating about common axes and adapted to support in common the thing conveyed, said rolls severally being adapted independently to rotate with and in response to differing motions of the respective parts of the thing resting upon and conveyed thereby and adapted between them to comprise laterally a substantially continuous broad surface.

3. A conveyer having therein a track comprising side rails, spindles mounted crosswise of the rails, and independently rotatable rolls at least one of which is cylindrical on the spindles, extending respectively a different part only of the distance between the rails and adapted in common to support the thing to be conveyed, whereby motion of a part of the thing conveyed at one side of the track can occur independently of motion of the cylindrical surface of a roll supporting another part of the thing at the other side of the track whatever the distance apart of the bearing surfaces of the load on the track.

4. A curved section for conveyers of the type comprising a single track for the passage of objects, said section having antifriction rolls therein for directing and supporting the object, the directing and supporting means at the inner and outer sides of the curve respectively being mounted on and movable independently by the passing object on spindles extending from side to side of the useful width of the track, the rolls at the concave side of the curve being cylindrical.

5. A curved section for gravity conveyers of the type comprising an antifriction track for the passage of objects, said section having antifriction means therein for directing and supporting the object, the directing and supporting means at the inner and outer sides of the curve respectively being movable independently by the passing object, the said means at the convex side of the curve being adapted to lift the object from extensive contact in a lateral sense with the surface of said means at the concave side of the curve.

6. A conveyer having therein a curved section comprising spaced side rails and a plurality of multiple rolls comprising component rolls coaxially rotatable on axes lying crosswise of the rails, each roll of said multiple rolls extending a part way only of the radial distance between the rails, and being rotatable independently of another roll thereof, the roll at the concave side of the curve being a cylinder.

7. A conveyer having therein a curved section comprising side rails, spindles held in the rails crosswise of the rails, and a plurality of independently rotatable rolls on each spindle, each roll extending respectively a different part only of the distance between the rails.

8. A conveyer having rails, spindles mounted crosswise of the rails, and rolls mounted on the spindles to provide an antifriction surface wholly above and clear of the rails for movement of objects to be conveyed and directed by the action of the roll surfaces, a section of the conveyer being laterally curved, and having therein a plurality of independently rotatable rolls on each spindle.

9. A conveyer comprising in adjacent succession multiple rolls each comprising two or more cylindrical rolls of the same diameter, and bearing means holding the rolls for free rotation independently on a common axis.

10. A multiple roll for conveyers having freely and independently rotatable load-supporting elements, one of said elements having a peripheral portion of greater diameter than any portion of the other element.

11. A multiple roll for conveyers having freely and independently rotatable cylindrical elements driven by the load conveyed thereby, one of said elements having a peripheral ring adapted to lift an object in contact therewith above portions of the surface of another of said elements.

12. A multiple roll for conveyers having cylindrical elements independently rotatable by a load moving upon them, one of said elements having a lifting and directing ring projecting from its cylindrical surface.

Signed by me at Boston, Massachusetts, this 13th day of May, 1918.

FRED R. TAISEY.